March 15, 1966     M. A. NOTH     3,240,961
ELECTRICAL ENERGY MEASURING DEVICE
Filed Oct. 22, 1962
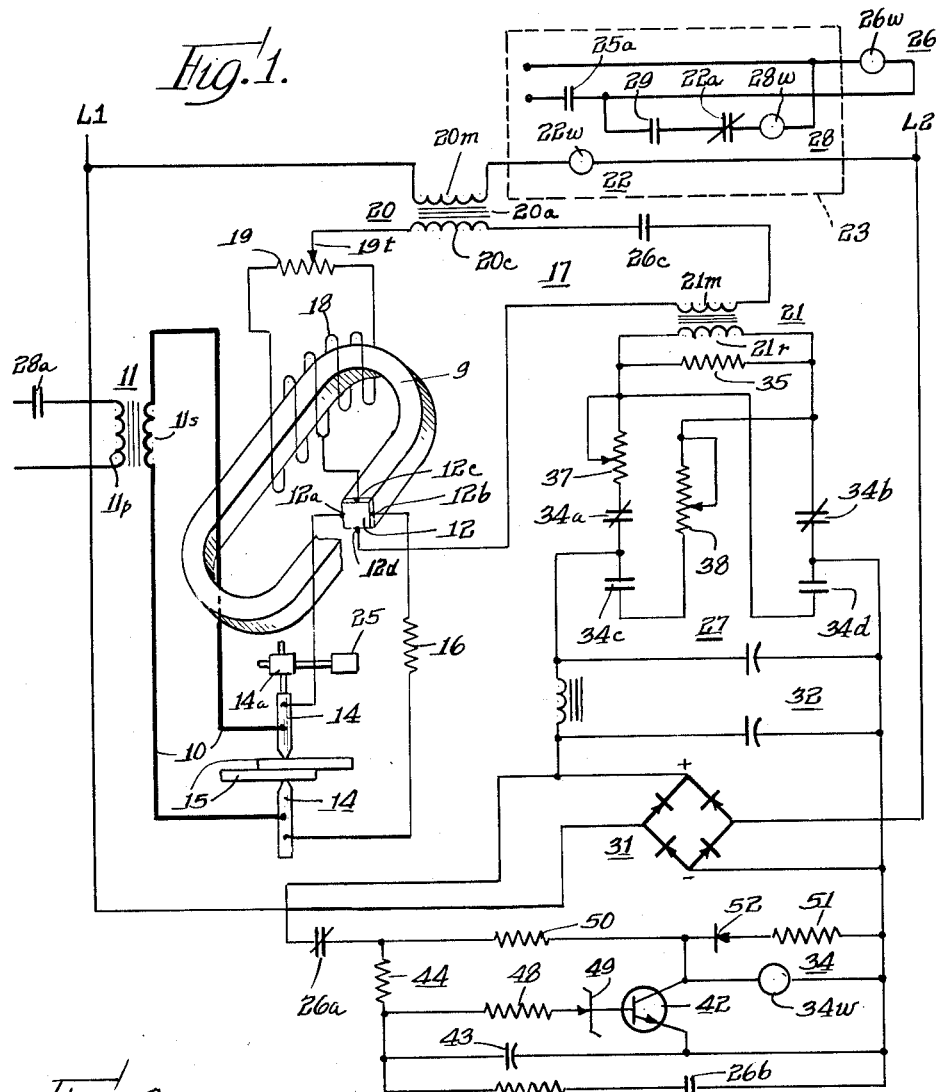
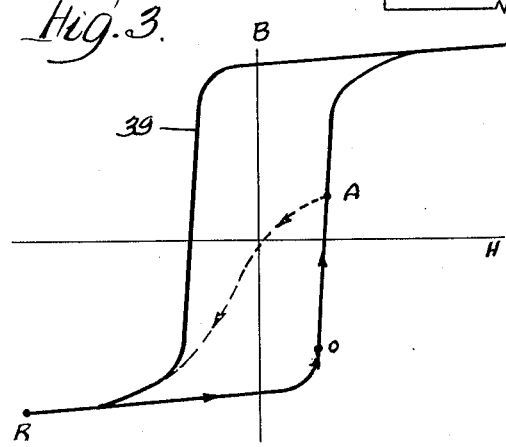
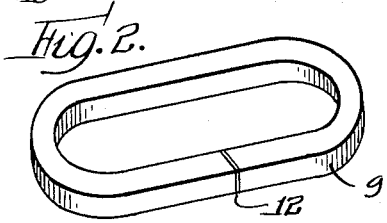
INVENTOR
Myron A. Noth United States Patent Office 3,240,961
Patented Mar. 15, 1966

3,240,961
ELECTRICAL ENERGY MEASURING DEVICE
Myron A. Noth, Park Ridge, Ill., assignor to Square D Company, Park Ridge, Ill., a corporation of Michigan
Filed Oct. 22, 1962, Ser. No. 232,093
9 Claims. (Cl. 307—125)

This invention relates to an integrator for determining the amount of energy transferred to a load through an electrical circuit during the time that the load is energized and more particularly to such an integrator using the Hall effect of a semiconductor crystal.

In many industrial control applications, it is desirable to integrate the amount of energy flowing in an electrical circuit with time and to effect a control function when a predetermined total amount of energy has been put into a load supplied by the circuit. For example, in controllers for resistance welding machines, there has been a need for a rugged, compact, and accurate energy integrator which can cooperate with the controller to permit a predetermined amount of electrical energy to flow into a weld and then to terminate the flow of welding current automatically. When the energy input to welds is thus accurately determined, welds of greater uniformity under conditions of variable resistance at the work pieces result than when the duration of the welding period is determined by time alone.

The present invention provides an automatic energy integrator in which a Hall effect crystal is arranged to be influenced by the magnetic field produced by the current flowing in a circuit to be monitored or controlled. Two of the terminals of the Hall crystal are input terminals and are supplied with a current directly proportional to the voltage of the circuit at the point where the current in the circuit is to perform its work and the voltage appearing at the other two or output terminals of the Hall crystal is applied across a control circuit comprising a relatively large inductor and a current responsive means connected in series, the current responsive means preferably being a bi-stable magnetic amplifier. The Hall crystal functions as a multiplier to give a voltage analog of the product of the current in the circuit to be monitored or controlled and the voltage across a load supplied by the circuit, and the inductor acts as an integrating means to integrate the voltage analog over a period of time. In a preferred embodiment of the invention, the output of the current-responsive means is arranged to control the flow of current in the circuit providing the magnetic field for the Hall crystal.

An object of this invention is to provide an improved device for measuring electrical power and integrating the power so measured with time.

A further object is to provide an electrical energy integrator using a Hall effect crystal to provide a voltage analog of power and a magnetic core to integrate the voltage analog with time to provide a current analog of energy.

A further object is to provide an energy measuring device in which a Hall effect crystal acts as a source of analog voltage proportional to electrical power and an inductor acts as an integrating means to integrate the analog voltage with time to provide a current analog of energy.

Other objects and advantages of this invention will become apparent from the following description wherein reference is made to the drawings, in which:

FIG. 1 is an elementary wiring diagram of an embodiment of the invention;

FIG. 2 shows how the Hall effect crystal may be interposed in a magnetic core; and FIG. 3 is a representation of a hysteresis loop of a magnetic core of FIGURE 1.

Referring to FIG. 1, a substantially closed magnetic core 9 surrounds one of a pair of conductors 10 forming part of a circuit in which the energy flow is to be measured and either monitored or controlled. The conductors 10, for example, may extend from a secondary winding 11s of a welder transformer 11 having a primary winding 11p. The core 9 could, as well, surround one of a pair of conductors leading to the primary winding 11p. In either case, the conductor could make more than one turn about the core 9 if desired. Although the invention is illustrated as applied to a circuit carrying alternating current, the invention operates in the same manner if the circuit carries direct current.

Interposed in an air gap of the core 9 in the manner indicated in FIG. 2 is a Hall effect crystal 12 having input terminals 12a and 12b and output terminals 12c and 12d. Preferably, the crystal 12 is of indium arsenide, although other semi-conductor crystals exhibiting a Hall effect can be used. The crystal 12 is preferably cemented in an air gap in the core 9 so as to be subjected to substantially all of the flux in the core. The air gap preferably should be as small as possible. Because the crystal 12 is only approximately 0.03 inch in thickness, its dimension longitudinally of the core 9 is of necessity exaggerated in the drawings.

In the embodiment shown, the input terminals 12a and 12b are connected across a pair of welding electrodes 14 arranged to engage juxtaposed work pieces 15 to be welded and supplied from the transformer 11 through the conductors 10. A current-limiting and stabilizing resistor 16 is interposed in series with the electrodes 14 and the terminals 12a and 12b thereby to increase the linearity of the relation between the current input to the crystal 12 and the voltage across the electrodes 14.

The output terminals 12c and 12d of the crystal 12 supply a control circuit 17 including a compensating winding 18 on the core 9, a resistor 19, a control winding 20c of a current magnitude responsive means such as a bi-stable magnetic amplifier 20, and a power or main winding 21m of a relatively large iron-cored inductor 21. The winding 18 serves to compensate for the voltage induced in the conductors connected to and adjacent the terminals 12c and 12d by the flux produced by current in the one of the conductors 10 surrounded by the core 9. As shown, the terminal 12c is connected to an intermediate point on the winding 18 which has its opposite terminals connected to opposite ends of the resistor 19, respectively. The control circuit 17 is completed through an adjustable tap 19t on the resistor 19.

The magnetic amplifier 20 has a saturable core 20a and a gate or main winding 20m. The winding 20m is connected across a source of alternating current L1–L2 in series with an operating winding 22w of an electromagnetic weld relay 22 having normally closed contacts 22a and forming part of a conventional welder controller, a portion only of which is shown, within the broken lines 23, to simplify the disclosure. It will be understood that the complete welder controller 23 includes well-known equipment for controlling both the operation of a fluid system 14a for moving the electrodes 14 and the supply of electrical energy to the electrodes 14. The illustrated portion of the welder controller comprises, in addition to the relay 22, normally open contacts 25a of a suitable pressure switch 25 associated with the fluid system 14a, the contacts 25a being arranged to control an electromagnetic relay 26 having an operating winding 26w, normally closed contacts 26a, and normally open contacts 26b and 26c. It will be understood that the contacts 25a operate in response to pressure in the fluid system 14a as is well known in the art. The contacts 26a and 26b are arranged to control a reset circuit 27 for the inductor 21 in a manner to be described, and the contacts 26c are interposed in the control circuit 17 in series with the Hall effect crystal 12, the winding 20m of the magnetic amplifier 20 and the winding 21m of the inductor 21. The contacts 22a of the weld relay 22 are arranged to control the deenergization of an operating winding 28w of an electromagnetic welder contactor 28 having normally open contacts 28a in supply lines leading from a suitable source of power (not shown) to the primary 11p of the welder transformer 11. The circuit including the operating winding 28w is arranged to be completed by closure of a suitable initiating switch 29 connected in series with the winding 28w and the contacts 22a and 25a.

In addition to the power winding 21m, the inductor 21 has a reset winding 21r arranged to be supplied with direct current through the reset circuit 27 from a full-wave rectifier 31 connected across the source L1 and L2. A filter 32 supplies filtered direct current from the rectifier 31 to the reset circuit 27 which circuit includes a pair of normally closed contacts 34a and 34b and a pair of normally open contacts 34c and 34d of an electromagnetic relay 34 having an operating winding 34w. A resistor 35 is connected in parallel with the winding 21r and a pair of resistors 37 and 38 are also arranged in the reset circuit 27 to control the magnitude of the current in the winding 21r.

Before an integration occurs, the relay 34 is energized and opens its contacts 34a and 34b and closes its contacts 34c and 34d thereby to effect reverse energization of the reset winding 21r to cause the flux in the core of the inductor 21 to be established at a point R on the hysteresis loop 39 of FIG. 3. The resistor 38 can be adjusted or pre-selected to establish this flux level. The relay 34 is then deenergized causing openings of its contacts 34c and 34d and closure of its contacts 34a and 34b so that the flux builds up in the core of the inductor 21 from the point R in FIG. 3 to a value indicated by a point O. The resistor 37 can be adjusted or pre-selected to establish this latter flux value.

The relay 34 may be controlled by any suitable time delay circuit. As shown, the time delay circuit comprises a transistor 42, a capacitor 43, a charging resistor 44, and a discharge resistor 45. The base of the transistor 42 is connected to the positive side of the rectifier 31 through the contacts 26a, the resistor 44, a resistor 48, and a Zener diode 49. A resistor 50 is provided to limit the current in the winding 34w, and a resistor 51 and a diode 52 are arranged to absorb stored energy in the winding 34w.

Upon initiation of a welding cycle, the pressure switch 25 in the welder controller 23 closes its contacts 25a to energize the relay 26 immediately after the application of suitable pressure to the work pieces 15 by the electrodes 14. Operation of the relay 26 closes the integrating loop 17 through its contacts 26c, and discharges the capacitor 43 by closing its contacts 26b. The control circuit 17 is now ready to integrate and the magnetization of the inductor 21 is at the point O in FIGURE 3 awaiting application of power to the plates 15 and the appearance of a Hall voltage at the terminals 12c and 12d. If the initiating switch 29 is now closed or was closed before the contacts 25a closed, the winding 28w of the welder contactor 28 is energized to close the contacts 28a and thus supply power to the primary 11p of the welder transformer 11 resulting in the flow of current in the conductors 10 and the electrodes 14.

Upon the flow of current in the conductors 10 and the electrodes 14, a Hall voltage proportional to the product of the current in the conductors 10 and the voltage across the electrodes 14 appears at the terminals 12c and 12d. This voltage is proportional to the amount of power being supplied to the plates 15 and causes a voltage directly proportional thereto to be applied to the control circuit 17. Because of the inductance of the inductor 21, the current in the circuit 17 resulting from this voltage builds up slowly as the flux in the core of the inductor 21 moves upwardly from the level indicated by the point O on the hysteresis loop 39 toward a level indicated by a point A at a rate dependent upon the magnitude of the product of the current in the conductors 10 and the voltage at the electrodes 14. The flux level O is selected so that the hysteresis loop is substantially a straight line between the level O and the level A causing the integration to be substantially linear with time.

When the flux reaches the level indicated by the point A, a predetermined amount of energy has passed through the electrodes 14 and the work pieces 15, and the current in the circuit 17 including the magnetic amplifier control winding 20c reaches a magnitude causing saturation of the core 20a of the magnetic amplifier 20. It will be understood that conventional bias windings (not shown) on the core 20a or other means can be used to determine the minimum current in the control circuit 17 which causes saturation of the core 20a. This is the current value corresponding to the flux level A. Upon saturation of the core 20a, the impedance of the winding 20m suddenly decreases to cause energization of the relay 22 which thereupon opens its contacts 22a to deenergize the winding 28w thereby to interrupt the flow of welding current by opening of the contacts 28a.

A short time later, after the end of a conventional "hold" period, determined by the controller 23, the pressure switch 25 opens. This causes deenergization of the relay 26 which opens the control circuit 17 at the contacts 26c, interrupts the discharge circuit for the capacitor 43 at its contacts 26b, and applies voltage through its contacts 26a to the operating circuit for the relay 34. The winding 34w is thereupon energized by current flowing through the resistor 50 and the relay 34 closes its contacts 34c and 34d and opens its contacts 34a and 34b to reset the flux in the core of the inductor 21 to the level indicated by the point R. The relay 34 remains energized until the capacitor 43 is charged through the resistor 44 sufficiently to cause breakdown of the Zener diode 49 which thereupon permits current to flow to the base of the transistor 42 driving the transistor 42 into saturation to cause a short-circuit of the winding 34w of the relay 34. Consequent dropout of the relay 34 then removes the reverse bias for the inductor 21 and completes the forward bias to set the flux in the core of the inductor 21 at the level O ready for the next welding cycle. The reset circuit 27 remains in this state until the relay 26 is again energized at the termination of the next welding cycle.

Having thus described my invention, I claim:

1. A device for controlling the amount of electrical energy transferred to a load through an electric circuit comprising:
   (1) a main circuit for conducting current to a load,
   (2) a Hall effect crystal positioned to be influenced by the magnetic field produced by current flowing in said main circuit to the load and having two pairs of terminals,
   (3) means for supplying a current directly proportional to the voltage across the load through one pair of said terminals,
   (4) means connecting said other pair of said terminals across a closed loop circuit,
   (5) means for initiating the flow of current in said main circuit,
   (6) means for delaying the rise in current in said loop circuit that occurs upon initiation of current flow in said main circuit, and
   (7) control means operative upon the current in said loop circuit reaching a predetermined value to alter the amount of current being conducted by said main circuit.

2. A device for controlling the amount of electrical energy transferred to a load through an electric circuit comprising:
(1) an electric circuit for conducting current to a load,
(2) a Hall effect crystal positioned in the magnetic field produced by said current and having two pairs of terminals,
(3) means for supplying a current directly proportional to the voltage across the load to one pair of said terminals, whereby a voltage directly proportional to the product of the current in the load and the voltage across the load appears at the other pair of said terminals,
(4) means connecting said other pair of terminals across a closed loop circuit,
(5) means for delaying the rise in current in said loop circuit upon the appearance of a voltage at said other pair of terminals, and
(6) control means operative upon increase of the current in said loop circuit to a predetermined value to alter the amount of current being conducted by said electric circuit to the load.

3. A device for controlling the amount of electrical energy transferred to a load through an electric circuit comprising:
(1) an electric circuit for conducting current to a load,
(2) a Hall effect crystal positioned to be influenced by the magnetic field produced by said current and having two pairs of terminals,
(3) means for supplying a current directly proportional to the voltage across the load through one pair of said terminals,
(4) an inductor,
(5) means connecting said inductor in a loop circuit across the other pair of said terminals, said inductor being operative to delay the rise in current in said loop circuit that occurs upon the appearance of a voltage at said other pair of said terminals, and
(6) control means responsive to the magnitude of the current in said loop circuit to alter the amount of current being conducted by said electric circuit to the load.

4. A device for controlling the amount of electrical energy transferred to a load through an electric circuit comprising:
(1) an electric circuit for carrying current through a load,
(2) a Hall effect crystal positioned to be influenced by the magnetic field produced by said current and having a pair of input terminals and a pair of output terminals,
(3) means for supplying a current directly proportional to the voltage across the load through said input terminals,
(4) an inductor,
(5) means connecting said inductor in a closed loop circuit with said output terminals, said inductor being operative to delay the rise in current in said loop circuit upon the appearance of a voltage at said output terminals, and
(6) control means responsive to the current in said loop circuit and operative to interrupt the current flow in said electric circuit upon the current in said loop circuit reaching a predetermined value.

5. A device in accordance with claim 4 characterized in that said inductor has an iron core and means are provided for pre-setting the flux level in said core prior to the appearance of a voltage at said output terminals.

6. A device for controlling the amount of electrical energy transferred to a load through an electric circuit comprising:
(1) an electric circuit for conducting current to a load,
(2) a Hall effect crystal positioned in the magnetic field produced by said current and having a pair of output terminals,
(3) means supplying a current directly proportional to the voltage across the load to said input terminals,
(4) an iron-cored inductor,
(5) a magnetic amplifier having a saturable core with a control coil means and a main coil means wound thereon,
(6) means connecting said inductor and said control coil means in series with each other in a closed loop circuit across said pair of output terminals,
(7) means for supplying a voltage across said main coil means, and
(8) control means responsive to the change in current in said main coil means that occurs when the current in said loop circuit increases to a value causing saturation of said core.

7. A device for controlling the amount of electrical energy transferred to a load through an electric circuit comprising:
(1) a source of power,
(2) a load,
(3) an electric circuit for conducting current from said source to said load,
(4) a Hall effect crystal positioned in the magnetic field produced by said current and having a pair of input terminals and a pair of output terminals,
(5) means supplying a current directly proportional to the voltage across the load through said input terminals,
(6) an inductor having a winding wound on an iron core,
(7) a magnetic amplifier having a saturable core with a control coil means and a main coil means wound thereon,
(8) means connecting said inductor winding and said control coil means in series with each other in a closed loop circuit across said pair of output terminals, said inductor being operative to delay the rise in current in said loop circuit that occurs upon the appearance of a voltage at said output terminals,
(9) means for supplying a voltage across said main coil means, and
(10) control means operative to interrupt the current in said electric circuit in response to the change in the current in said main coil means that occurs when the current in said loop increases to a value causing saturation of said core.

8. A device in accordance with claim 7 characterized in that flux resetting means are provided to reset the flux in said core of said inductor after operation of said control means.

9. A device in accordance with claim 7 characterized in that a means operable for reversing the flow of current in said inductor winding for a predetermined time interval is rendered operative upon operation of said control means.

References Cited by the Examiner

UNITED STATES PATENTS

| | | | |
|---|---|---|---|
| 1,959,690 | 5/1934 | Roth | 219—110 |
| 2,440,962 | 5/1948 | Livingston | 171—95 |
| 2,748,380 | 5/1956 | Platte et al. | 340—253 |
| 2,942,177 | 6/1960 | Neumann et al. | 324—37 |

LLOYD McCOLLUM, *Primary Examiner.*

RICHARD M. WOOD, *Examiner.*